US012525093B2

(12) United States Patent
Benes

(10) Patent No.: US 12,525,093 B2
(45) Date of Patent: Jan. 13, 2026

(54) SYSTEM AND METHOD FOR ON-LINE SIMULATED AND NON-SIMULATED GAMBLING

(71) Applicant: Travis Benes, Dover Gardens (AU)

(72) Inventor: Travis Benes, Dover Gardens (AU)

( * ) Notice: Subject to any disclaimer, the term of this patent is extended or adjusted under 35 U.S.C. 154(b) by 268 days.

(21) Appl. No.: 18/268,539

(22) PCT Filed: Dec. 17, 2021

(86) PCT No.: PCT/AU2021/051518
§ 371 (c)(1),
(2) Date: Jun. 20, 2023

(87) PCT Pub. No.: WO2022/126203
PCT Pub. Date: Jun. 23, 2022

(65) Prior Publication Data
US 2024/0029510 A1    Jan. 25, 2024

(30) Foreign Application Priority Data
Dec. 18, 2020    (AU) ................................. 2020904720

(51) Int. Cl.
*G07F 17/32* (2006.01)
*G06Q 50/34* (2012.01)

(52) U.S. Cl.
CPC ......... *G07F 17/3244* (2013.01); *G06Q 50/34* (2013.01); *G07F 17/323* (2013.01);
(Continued)

(58) Field of Classification Search
CPC ............... G07F 17/323; G07F 17/3269; G07F 17/3288; G07F 17/3276; G07F 17/3225;
(Continued)

(56) References Cited

U.S. PATENT DOCUMENTS

| 5,762,552 A | * | 6/1998 | Vuong | G07F 17/3223 |
| | | | | 463/25 |
| 11,127,249 B2 | | 9/2021 | Ginsberg et al. | |
| 2020/0051378 A1 | * | 2/2020 | Ginsberg | G07F 17/3241 |

OTHER PUBLICATIONS

Ladbrokes.com main page [retrieved from internet on Feb. 8, 2022]; <URL: https://web.archive.org/web/20201201021101/https://sports.ladbrokes/com/> published on Dec. 1, 2020 as per Wayback Machine.
(Continued)

*Primary Examiner* — Pierre E Elisca
(74) *Attorney, Agent, or Firm* — Williams Mullen; R. Brian Drozd

(57) ABSTRACT

A method of engaging with an on-line gambling service in which a user accesses an on-line gambling system that monitors real world events and calculates odds in respect of the events and aspects upon which wagers can be placed, the on-line gambling system publishing the events and the aspects upon which wagers can be placed including odds offered to users wherein the user obtains gambling credits from the on-line gambling system, the user places a timely wager by allocating gambling credits to the wager; and the user receiving an indication regarding the result of the real world event and the winnings, or losses, attributable to the user with winnings provided to the user by the allocation of gambling credits to the users on-line gambling credit account or, in the event the user incurs a loss, the appropriate number of gambling credits deducted from the users on-line gambling credit account.

19 Claims, 8 Drawing Sheets

(52) U.S. Cl.
CPC ...... *G07F 17/3269* (2013.01); *G07F 17/3288* (2013.01); *G07F 17/3276* (2013.01)

(58) Field of Classification Search
CPC ... G07F 17/3241; G07F 17/3251; A63F 13/79
USPC .......................................................... 463/25
See application file for complete search history.

(56) References Cited

OTHER PUBLICATIONS

Ladbrokes.com Terms and Conditions [retrieved from internet on Feb. 8, 2022]; <URL: https://web.archive.org/web/20201125140656/ https://help.ladbrokes.com/en/general-information/legal-matters/ terms-and-conditions> published on Nov. 25, 2020 as per Wayback Machine.

Frahn et al; "Exposure to Free-Play Modes in Simulated Online Gaming Increases Risk-Taking in Monetary Gambling;" Journal of Gambling Studies; vol. 31(4); 2014.

Feb. 11, 2022 International Search Report issued in International Patent Application No. PCT/AU2021/051518.

Feb. 11, 2022 Written Opinion issued in International Patent Application No. PCT/AU2021/051518.

\* cited by examiner

SYSTEM AND METHOD FOR ON-LINE SIMULATED AND NON-SIMULATED GAMBLING

FIELD OF THE INVENTION

The present invention provides an improved system and method for on-line gambling and is particularly relevant to novice users who may be unaware of the significant and substantial negative consequences that may occur when engaging in on-line gambling. The present invention is also relevant to problem users who struggle to control their gambling activity and require controls and/or restrictions implemented by an on-line gambling platform to assist them to control their gambling behaviour.

BACKGROUND OF THE INVENTION

Gambling on real world events such as sporting events has been known for a long time. More recently, with the advent of high-speed data communication networks such as the internet, on-line gambling services have been provided such that users may readily access gambling services to place wagers upon real world events with the use of computing devices such as laptops, smart phones and tablet devices.

With the advent of on-line gambling services, the incidence of gambling problems in which users exhibit negative behaviours has increased dramatically.

In addition, with respect to users, the consumer market has increased its demographic range such that much younger consumers are now engaging in gambling in view of the relative ease with which to access gambling services and to place wagers and receive winnings, or incur liabilities or losses. Whilst age limits apply with respect to younger users, upon engaging a gambling service for the purpose of placing wagers and gambling upon real world events, younger users are nevertheless generally more susceptible to mistakes whilst they increase their knowledge regarding the real world events upon which they are placing wagers. Further, aspects associated with gambling including the calculation of odds, such as fixed odds and pari-mutuel arrangements with respect to real world events also require experience to obtain a competent understanding.

Unfortunately, for novice users and problem users, who understand that they have a tendency to exhibit negative behaviours when engaged in gambling, are only able to select from a range of on-line gambling services that have a substantial risk of mistakes (on the part of novice users) or continue to enable negative behaviour (on the part of problem users) without any facility for either type of user to avoid the otherwise negative financial consequences associated with engaging in on-line gambling.

Accordingly, there is a need for a simulated on-line gambling facility that provides the usual stimulus associated with engaging in gambling upon real world events with real time responses to read world events without the usual problems associated with the financial losses that can occur when engaging with standard on-line gambling services.

However, when operating an online gambling facility, the data transfer requirements per user are substantial and hence the bandwidth demand is also substantial which adversely impacts the technical performance of the data communications network across which data is transferred to effect the on-line gambling service.

As a result, there is more specifically a need for a simulated on-line gambling facility that avoids undue adverse impact upon data communications networks.

SUMMARY OF THE INVENTION

In one aspect, the present invention provides a method of engaging with an on-line gambling service in which a user accesses an on-line gambling system that monitors real world events and calculates odds in respect of the events and aspects upon which wagers can be placed, the on-line gambling system publishing the events and the aspects upon which wagers can be placed including odds offered to users wherein the user obtains gambling credits from the on-line gambling system, the user places a timely wager including a wager amount by allocating gambling credits to the wager; and the user receiving, upon completion of the real world event upon which a wager has been placed, an indication regarding the result of the real world event and the winnings, or losses, attributable to the user with winnings provided to the user by the allocation of gambling credits to the users on-line gambling credit account or, in the event the user incurs a loss as a result of the wager, the appropriate number of gambling credits deducted from the users on-line gambling credit account.

Preferably, gambling credits are provided in the form of a crypto-currency offered solely by the on-line gambling platform with credit accounts established for each user upon registration with the on-line gambling system.

When the user is a "novice", the on-line gambling system may allocate free credits to the novice such that they may engage in gambling activities without any concern regarding financial loss. In this regard, novice users may gain knowledge regarding real world events upon which wagers may be placed and how to best predict winning outcomes and engage with the on-line gambling system to place wagers accordingly. This engagement with an on-line gambling system teaches novice users the extent to which they could incur substantial financial loss due to their lack of knowledge and/or experience.

Problem users with known negative gambling behaviours may establish a credit account and purchase credits with real funds and preferably, the conversion rate between real funds and crypto-currency credits is a factor such that the user receives the stimulation associated with placing wagers for large amounts.

Preferably, for problem users (and possibly novice users) the number of gambling credits that may be wagered in a pre-defined period is limited thereby preventing the novice and/or problem user from devoting gambling credits exceeding a threshold for the pre-defined period to wagers upon events.

Preferably, the on-line gambling system enables users to place wagers on any sports market in the world.

Preferably, the on-line gambling system provides details regarding real world events upon which wagers may be placed in real time and provide indications regarding results of the events also in real time since this aspect of the on-line gambling system will ensure that the user has a similar experience with the on-line gambling system of the present invention as compared with existing gambling service providers who provide their results in real time.

In the event a user converts real money into gambling credits, the user is preferably able to convert any winnings in the form of gambling credits into real money using substantially the same return conversion rate (adjusted to account for a service charge) that was used when converting real money into gambling credits.

The on-line gambling system preferably enables the creation of virtual rooms where groups of users may collectively compete with other users in the same virtual room and where the best user is ranked each week for that particular group.

Preferably, with respect to any arranged group of users, the on-line gambling system operates the group for a pre-defined period of time during which users within the group may compete to determine the best user for the pre-defined period of time.

Preferably the on-line gambling system of the present invention provides the ability to gamble using "multi-bets" such that users can place wagers upon a number of events.

The determination of the most successful user within a particular group and/or period of time is preferably based upon the gambling profit of each of the users over that time period.

In another aspect, the present invention provides an on-line gambling system operable to receive wagers from users in respect of real world events, the on-line gambling system capable of receiving wagers solely with gambling credits recognised by the gambling system, the on-line gambling system including a data feed providing data in respect of real world events upon which gamblers may place wagers, an odds calculator operable to calculate odds in respect of aspects of real world events, a wager interface operable to present users with details of real world events upon which gamblers may place wagers and to receive wagers from gamblers including a wager amount in gambling credit, a wager recordal database operable to store details of wagers including the event, the odds and wager amount placed by the gambler, and a wager result determination calculator operable to receive details of events and aspects of events upon which wagers were available for gamblers and upon completion of an event, calculating the winnings, or losses, attributable to gamblers who placed wagers on the event and wither allocating winnings to the gamblers credit account or deducting losses from the gamblers credit account.

In yet another aspect, the present invention provides a computer-readable medium that, when executed on a computer, causes one or more computer processor devices to perform the steps of monitoring, with the one or more processors, real world events, calculating, with the one or more processors, odds in respect of the events and aspects upon which wagers will be accepted, publishing, by the one or more processors, the events and the aspects upon which wagers are placed including odds offered to users wherein providing, to a user, gambling credits from the on-line gambling system, receiving, from the user, a timely wager including a wager amount by allocating gambling credits to the wager; and providing, to the user, upon completion of the real world event upon which a wager has been placed, an indication regarding the result of the real world event and the winnings, or losses, attributable to the user with winnings provided to the user by the allocation of gambling credits to the user's on-line gambling credit account or, in the event the user incurs a loss as a result of the wager, the appropriate number of gambling credits deducted from the user's on-line gambling credit account.

In one embodiment, the on-line gambling system monitors the user registration status and in particular, monitors whether users are effecting wagers using gambling credits according to a pseudo currency that has a minimal or zero real world value such that the gambler may gain the knowledge and experience required using the on-line gambling system whilst receiving tangible results regarding their wager. In those instances where users are effecting wagers with zero, or minimum, value credits, the on-line gambling system may actively reduce the frequency of updates regarding the real world events and/or any other data such as the aspects of the events upon which wagers may have been placed and the odds offered in respect of those aspects, such that the data transfer across a data communications network that is accessed for the purpose of placing wagers and receiving results regarding the real world event are limited thereby conserving the data communications bandwidth of the data communications network. In this regard, when the gambling system is operating in the mode of "simulated gambling" with users effecting wagers with zero, or minimal, value credits, the system is configured to actively reduce the amount of data transferred to such a user as compared with a user who is engaged in "non-simulated gambling". Whilst reducing the amount of data transfer for any users engaged in "simulated gambling" reduces the potential for user activity to adversely impact the technical performance of data communications networks used to access the on-line gambling system, the reduction in data transfer will not significantly impact upon the simulated users ability to gain knowledge and/or experience using the "simulated" on-line gambling system.

Preferably, the reduction in the amount of data transferred in respect of users who engage the on-line gambling system for the purpose of "simulated gambling", is implemented in respect of any operational aspect of the online gambling system for which data is transferred to provide a "simulated gambling" experience. In addition to reducing the amount of data transferred during a "simulated gambling" experience by limiting the frequency with which real world events are updated and reported to online gamblers, additional approaches to reducing the amount of data transfer include a reduction in the number of real world events upon which gamblers may place wagers, a reduction in the number of aspects regarding the real world events upon which wagers may be placed, and the frequency with which gambling credits are updated upon completion of an event upon which a simulated gambling wager has been placed. As will be recognised by skilled readers, as long as a simulated gambling experience provides a sample of real world events and aspects of real world events upon which wagers may be placed, the gambler will obtain the understanding and experience associated with placing wagers upon those real world events and aspects of the real world events for the purpose of attempting to obtain a gambling profit. In the event that a simulated gambling user is sufficiently discouraged from purchasing gambling credits that have a significant real world value (ie transition to non-simulated gambling), the user may continue to only use the gambling system for the purpose of simulated gambling. In any event, when offering an on-line gambling system that may operate in the mode of a "simulated" gambling system and a "non-simulated" gambling system, it is expected that there will be many more users who engage with the gambling system in the form of a "simulated gambler" whereas the number of gamblers who transition to "non-simulated gambling" with credits that have a real world value should be significantly fewer. Hence, the system may only activate data transfer reduction for simulated gamblers who are expected to represent a significant number of users registered with the on-line gambling system as compared with "non-simulated" gamblers who will be more likely to compare the services provided by the on-line gambling system in a "non-simulated" mode with other on-line gambling systems and would likely notice any data reduction techniques regarding their activities when seeking to place wagers upon real world events with real world credit values.

BRIEF DESCRIPTION OF THE DRAWINGS

FIG. 3 details a user installing an application of the system, registering their details and logging in.

DETAILED DESCRIPTION OF EMBODIMENT(S) OF THE INVENTION

The present invention will now be described with reference to a preferred embodiment of the invention.

In a preferred embodiment the present invention provides a computer implemented system and method of on-line gambling using a pseudo or gambling currency that enables both novice and problem users to experience betting with large nominal values without risking large values of real currency. Users exchange traditional currencies for gambling currency with an exchange rate such that small quantities of traditional currency equate to a large quantities of gambling currency. This allows users to feel the excitement of placing large bets, but in reality they are only wagering amounts of zero value or relatively small amounts of real currencies. This allows novice gamblers to learn about the potential for substantial negative consequences of on-line gambling, and also allows problem gamblers to place large wagers to thereby experience the thrill of gambling without incurring real and/or large losses.

The system monitors real world events and calculates odds in respect of the events and aspects upon which wagers can be placed. The system publishes the events and the aspects upon which wagers can be placed including odds offered to users. The users obtain gambling credits from the on-line gambling system, place a timely wager including a wager amount by allocating gambling credits to the wager, and upon completion of the real-world event upon which a wager has been placed, receive an indication regarding the result of the real-world event and the attributable winnings, or losses. Winnings are provided to users by the allocation of gambling credits to the user's on-line gambling credit accounts or, in the event the user incurs a loss as a result of the wager, the appropriate number of gambling credits deducted from the user's on-line gambling credit account.

Figure 1:
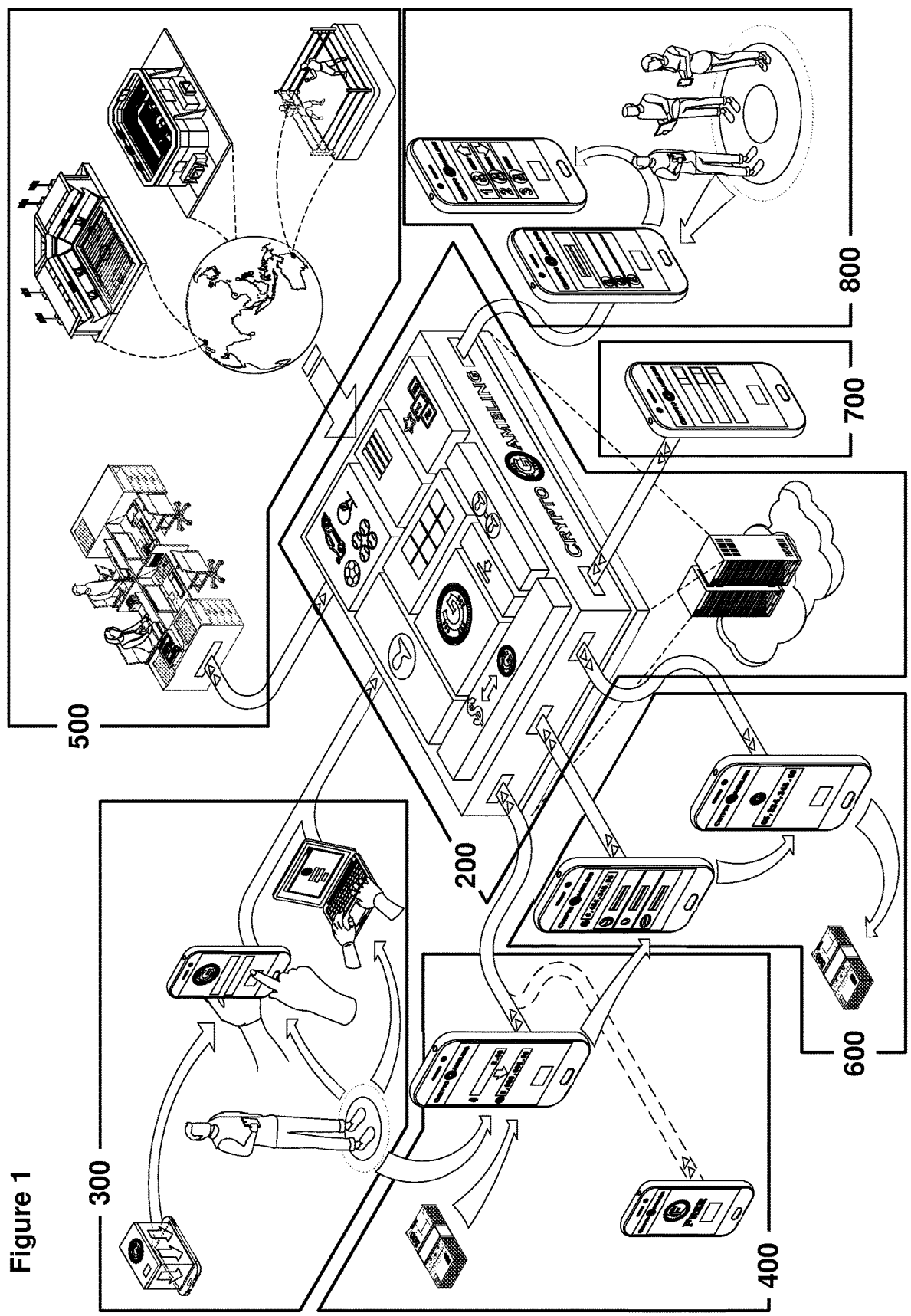
FIG. 1 details a top-level block diagram of a system and method of on-line gambling according to a preferred embodiment of the invention.

FIG. 1 provides an overview of an implementation of the system and is divided into segments 200 to 800 which are further expanded and described in subsequent Figures. The system may be a local or a cloud-based client/server solution with a server in segment 200 controlling the system and providing via one or more computer applications functions such as user accounts, currency exchange, wagering accounts for user, multiple betting markets, wagering odds, wagers, results and limits on users' activities. The server is in communication with administrators and users through various interfaces (120). Segment 300 provides user set-up functionality, allowing a user to install an application to access the system, register their details and login to the system. Adding funds to a user's account is affected by segment 400, whilst segment 500 arranges the placing of wagers and withdrawing winnings. Administrative functions such as framing markets, determining odds and entering results are affected in segment 600. Segment 700 allows users to place self-imposed limits on their gambling activity. The system also supports virtual rooms in segment 800, allowing users to interact and compete with each other.

Figure 2:
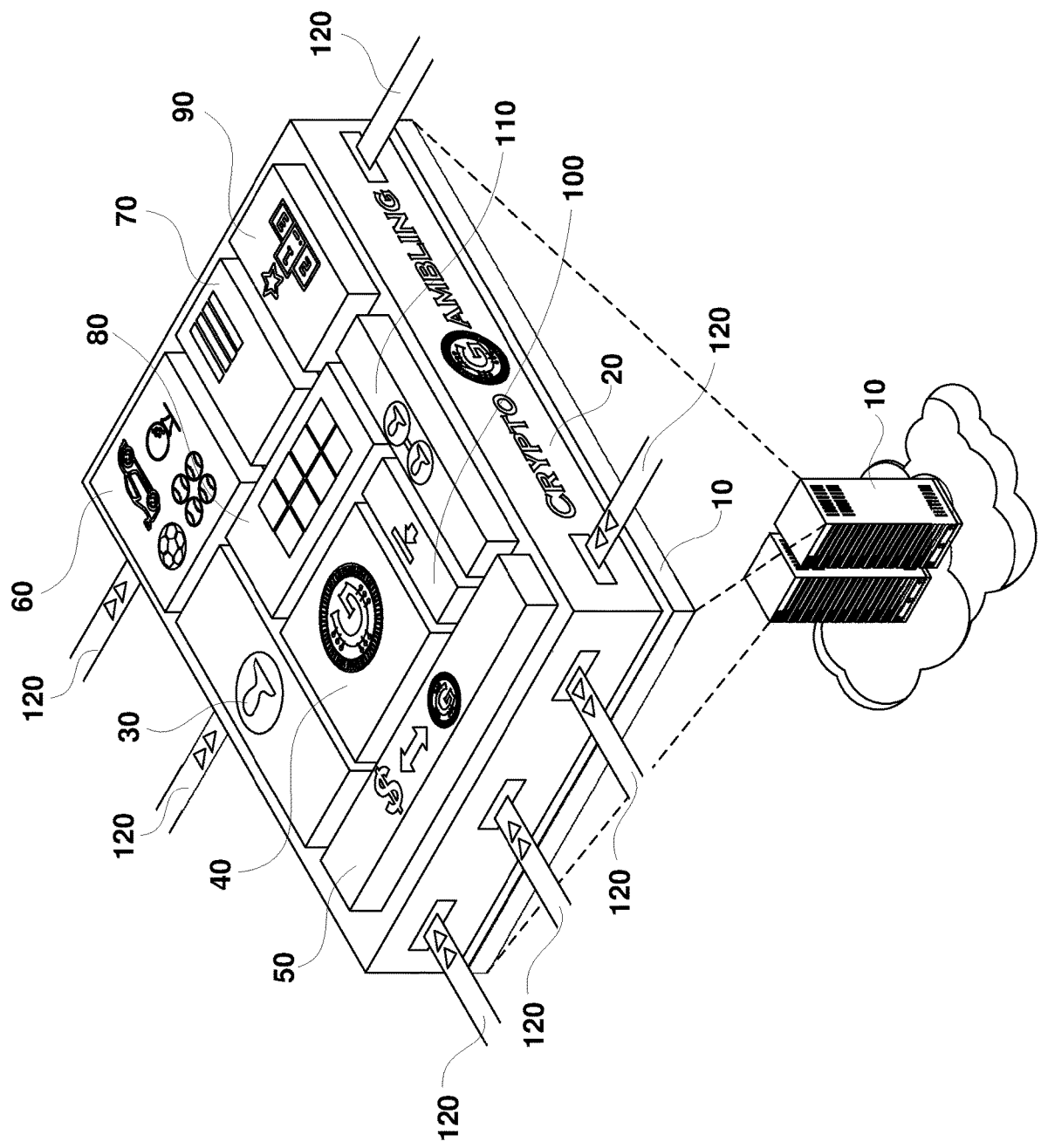
FIG. 2 details the server component of the system and its interactions with users and administrators.

FIG. 2 depicts in greater detail segment 200 which provides the core system infrastructure 10, including a local or cloud-based server (20) in communication (120) with users (130) and administration staff (240) (as discussed below in relation to segment 300) to a server component of the system. Communication with various server functions is provided by using applications on mobile devices or browser applications via the internet or similar data communications network.

The server (20) executes one or more computer applications that provide the core functions of the system represented by blocks 30 to 110. Function block (30) provides user accounts, allowing users to register with the system and store personal details such as name, age, address, email and phone contact details. Function block (40) provides wagering accounts for the users and can support separate balances for a range of gambling currencies. Currency exchange is provided by function block (50) and allows users to convert real currencies into gambling currencies and vice-versa.

A small fee is charged for the currency exchange. The exchange rates provided ensure that a user receives a much larger numerical value of gambling currency, for example, one dollar converts to 1,000,000 units of gambling currency. This allows users to wager large numerical values which have a relatively small real monetary value. The exchange rate may be a number that doesn't allow the user to readily calculate the exchange rate, such as one dollar equating to 826,455 units of gambling currency. This further enhances the illusion of wagering large numerical values.

Function block (60) supports multiple betting markets, allowing users to wager on a large range of real-world sporting events from around the world in real-time. Markets are provided for the outcome of events, such as game scores, the winner or "placing", and actions within an event such as the first goal kicker or the time of the first goal.

Function block (70) provides betting odds for each market which are framed by calculations and administration staff. The odds define how much will be returned on a wager. Users can also combine events from a single market, or across markets, with multi-bets to increase the odds. Function block (80) provides wagering functionality, allowing users to use gambling currency from their wagering accounts to wager on single or combined events with defined odds. To assist problem gamblers, function block (100) provides limits on a user's wagering and can set a series of limits or time periods for wagering. This may restrict users to only a certain number of wagers or restrict the value of wagers that can be placed in a pre-determined time period. Alternately limits may be placed on times of the day or week that wagers can be placed. To provide social interaction for the users, function block (110) provides virtual room functionality, allowing users to connect with other users to form virtual rooms in which they conduct private competitions.

Figure 3:
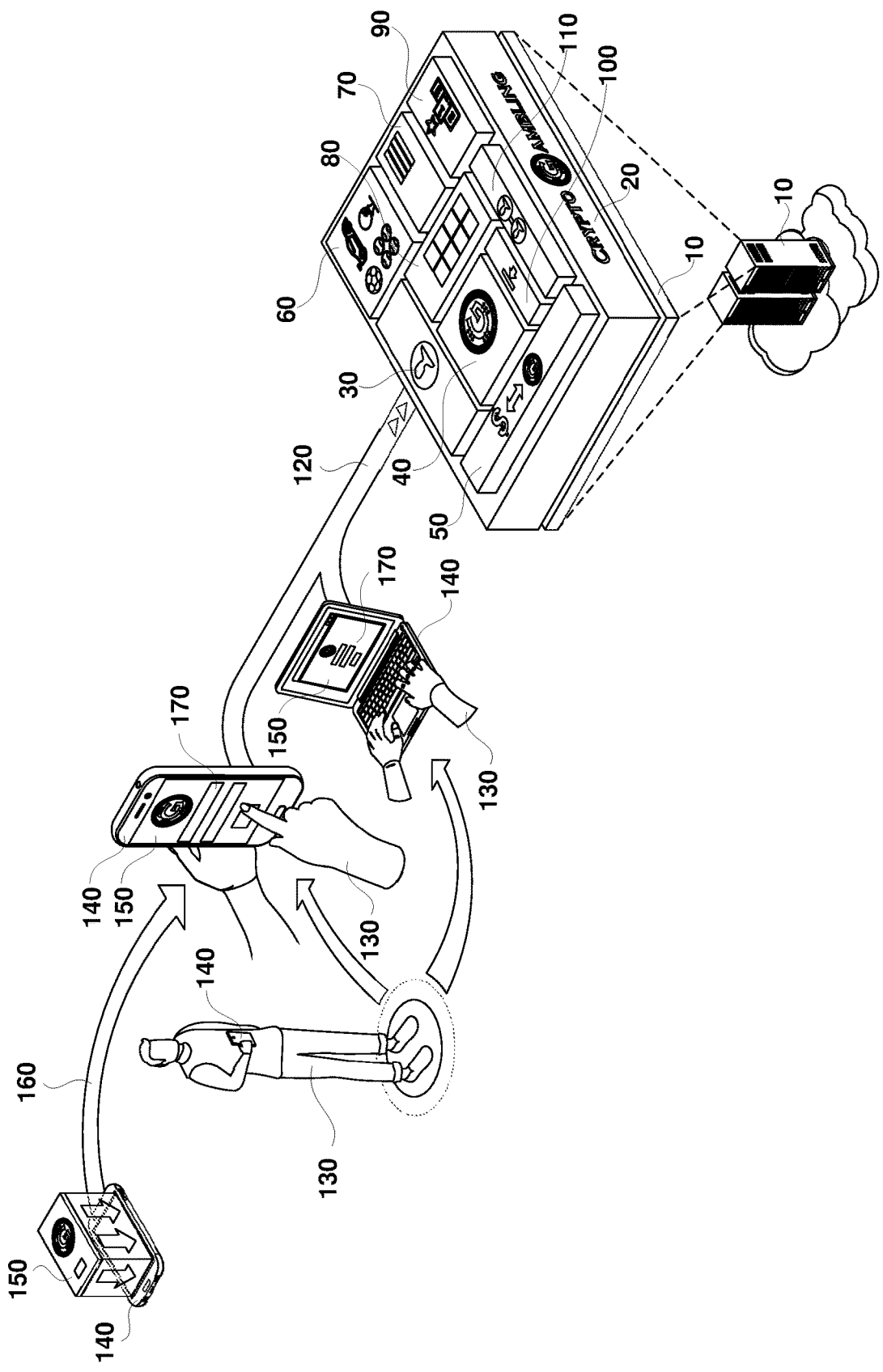

User set-up is provided by segment 300 as shown in detail in FIG. 3. A user (130) first downloads the wagering application (150) of the system and installs it (160) on their smart device (140) which can be either a smart phone or tablet device. Alternatively, the system may be accessed on a PC or laptop via a web browser application. Once installed, the application is used to register a user account with the user account block (30) of the server (20). As part of the process, users will need to provide details about themselves such as a user name, date of birth, address, email address and mobile number. Use of the application may also require the payment of fee, which may be a one-off fee or an ongoing subscription. Once registered, the user can login (170) to access further system functionality such as adding funds, wagering, and withdrawing funds.

Figure 4:
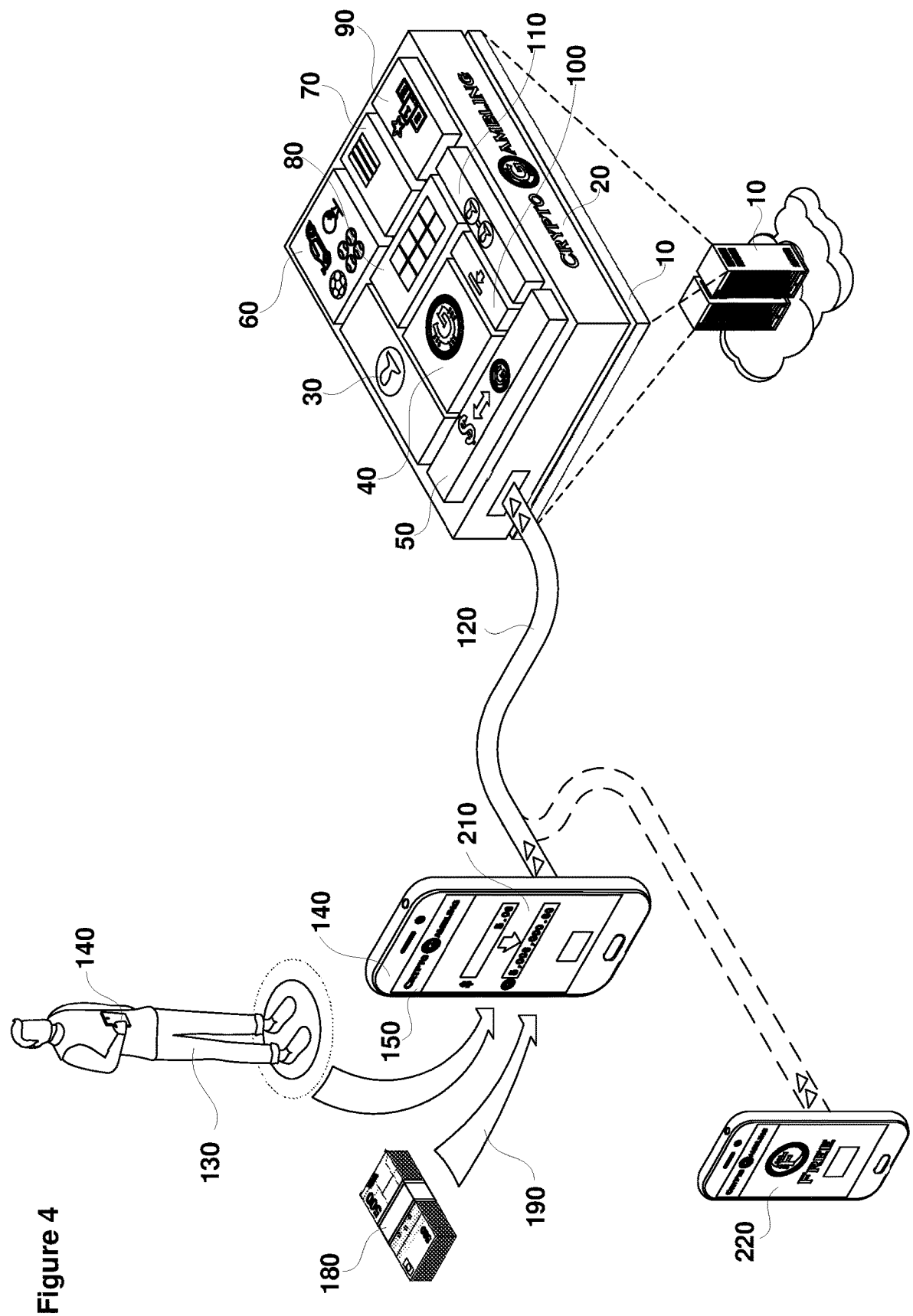
FIG. 4 details a user crediting their wagering account.
Figure 5:
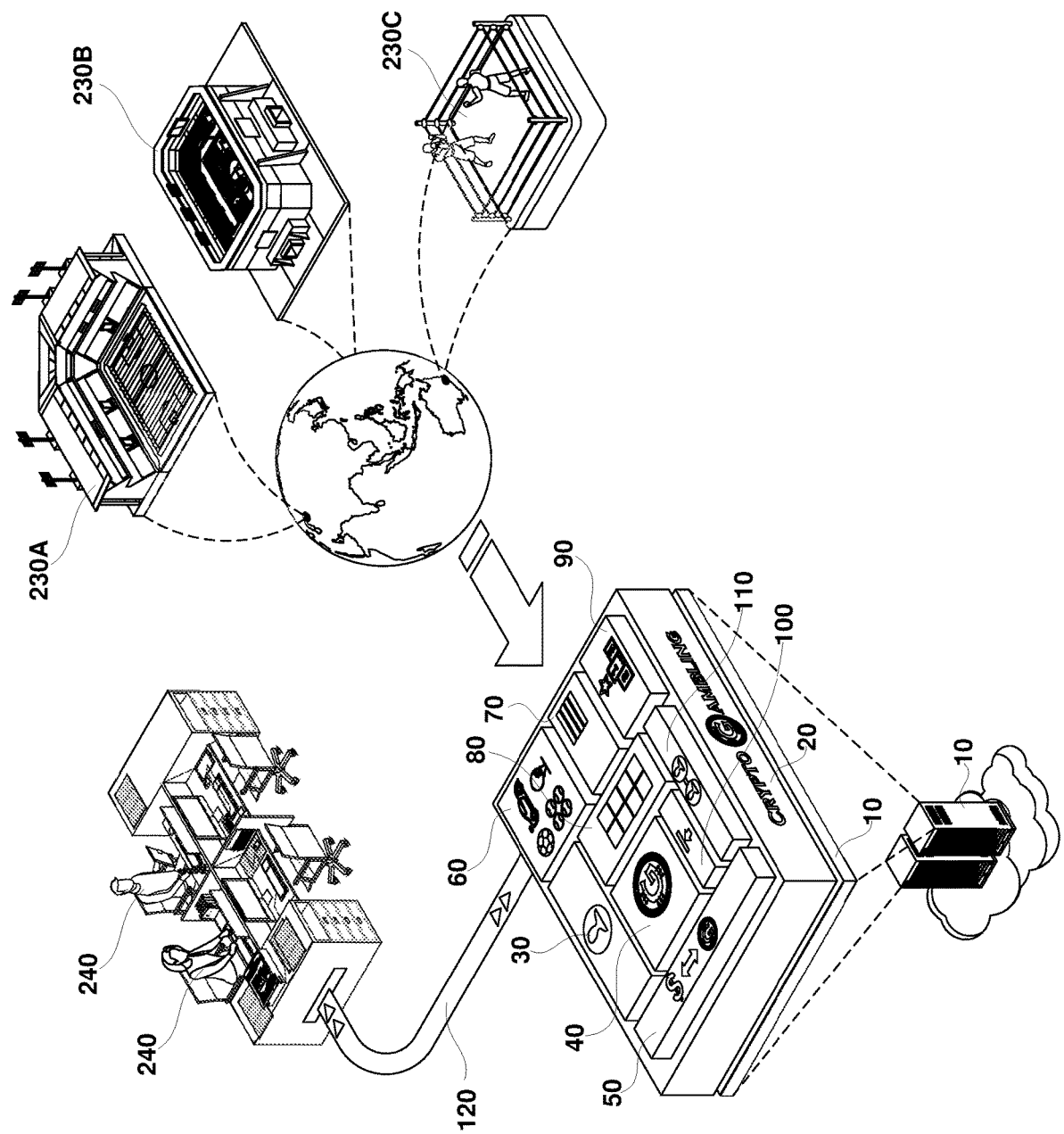
FIG. 5 details the administration of the system by administration staff.

Credit can be added to a user's wagering account as depicted in segment 400 which is detailed in FIG. 4. A user (130) uses the crediting account screen (210) of the application (150) on their device (140) to effect either a bank transfer or a credit card payment to add funds to their wagering account using a traditional currency. The traditional currency is exchanged into gambling currency and a small fee is charged. The exchange rate is such that a small amount of traditional currency equates to a large quantity of gambling currency. Alternatively, the user can choose to wager using a valueless practise gambling currency which is obtained through a practise wager screen (220). Using a valueless currency allows an amateur gambler to experience and learn wagering without the danger of losing a substantial amount of real funds. The practise gambling currency cannot be exchanged for either normal gambling currency nor for traditional currency. A small administrative fee may be charged for using the practise gambling currency FIG. 5 depicts in greater detail the administrative functions in segment 500 used by administration staff (240) to administer the system. The staff will administer the markets (60), odds (70) and results (90). This may include framing markets and monitoring wagering by users of the platform. Sporting events (230A, 230B and 230C) show examples of different worldwide sporting markets that the staff administer, namely, football, basketball and boxing respectively.

Figure 6:
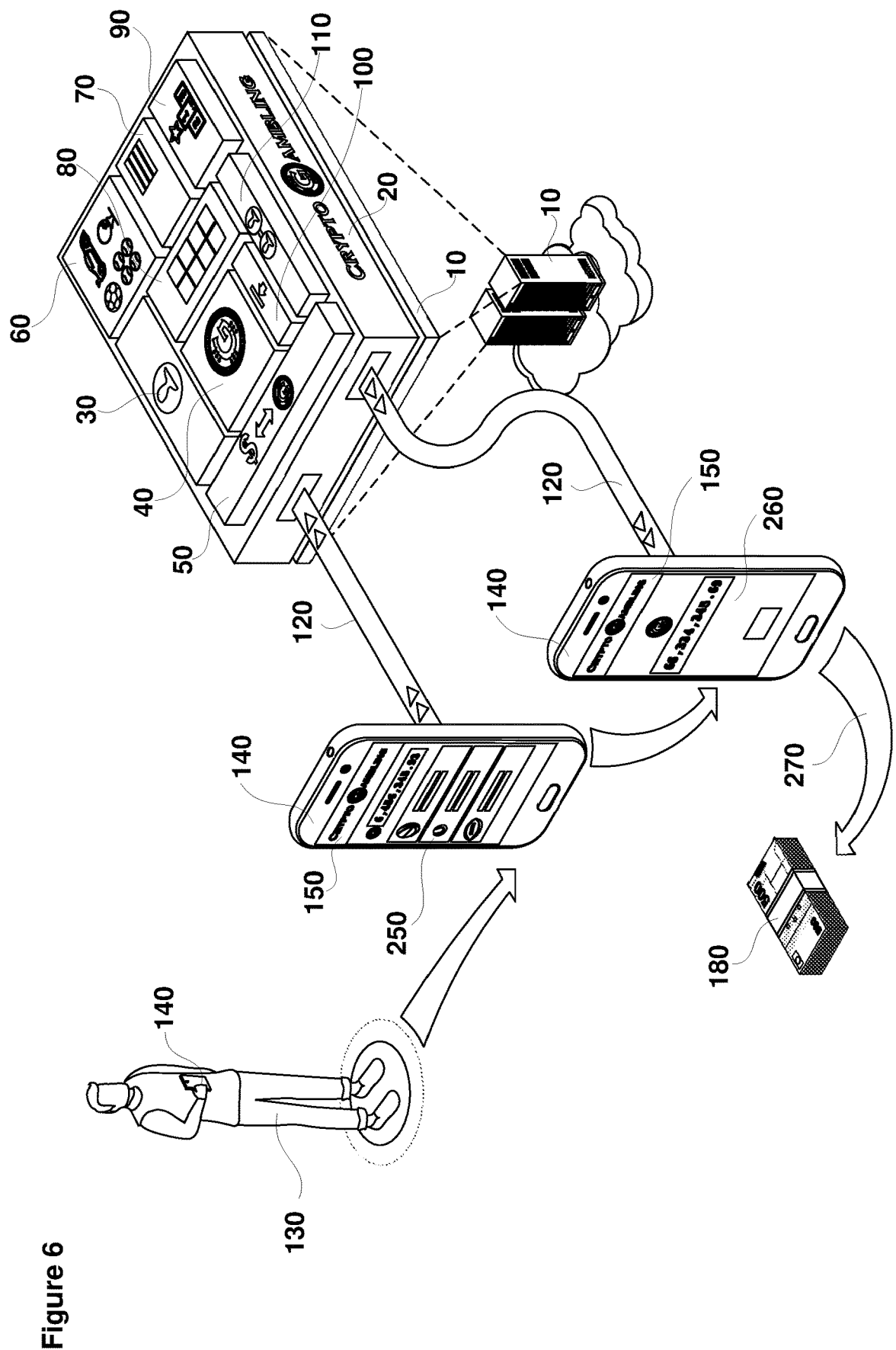
FIG. 6 details a user operating the system to place wagers and collecting their winnings.

Segment 600 is depicted in greater detail FIG. 6 in which a user (130) places wagers using the gambling currency in their wagering account and collects winnings if they are successful with the aid of betting screen (150). Users (130) can review the markets (60) and the available odds (70) and subsequently place a wager (80) using gambling credits from their wagering account (40). Users can wager on any sports markets in the world in real-time and can also combine markets with multi-bets. Once a result has been established, any winning based on the results of their wagers will be immediately credited to their wagering account. These credits can be used to place more bets or be withdrawn (270) from their wagering account using the review winnings screen (260), in which case the gambling currency is exchanged for traditional currency and credited to the users (130) bank account. Users wagering with practise gambling currency may be able to exchange winnings for prizes or discounts similar to known incentive schemes such as frequent flyer points.

Figure 7:
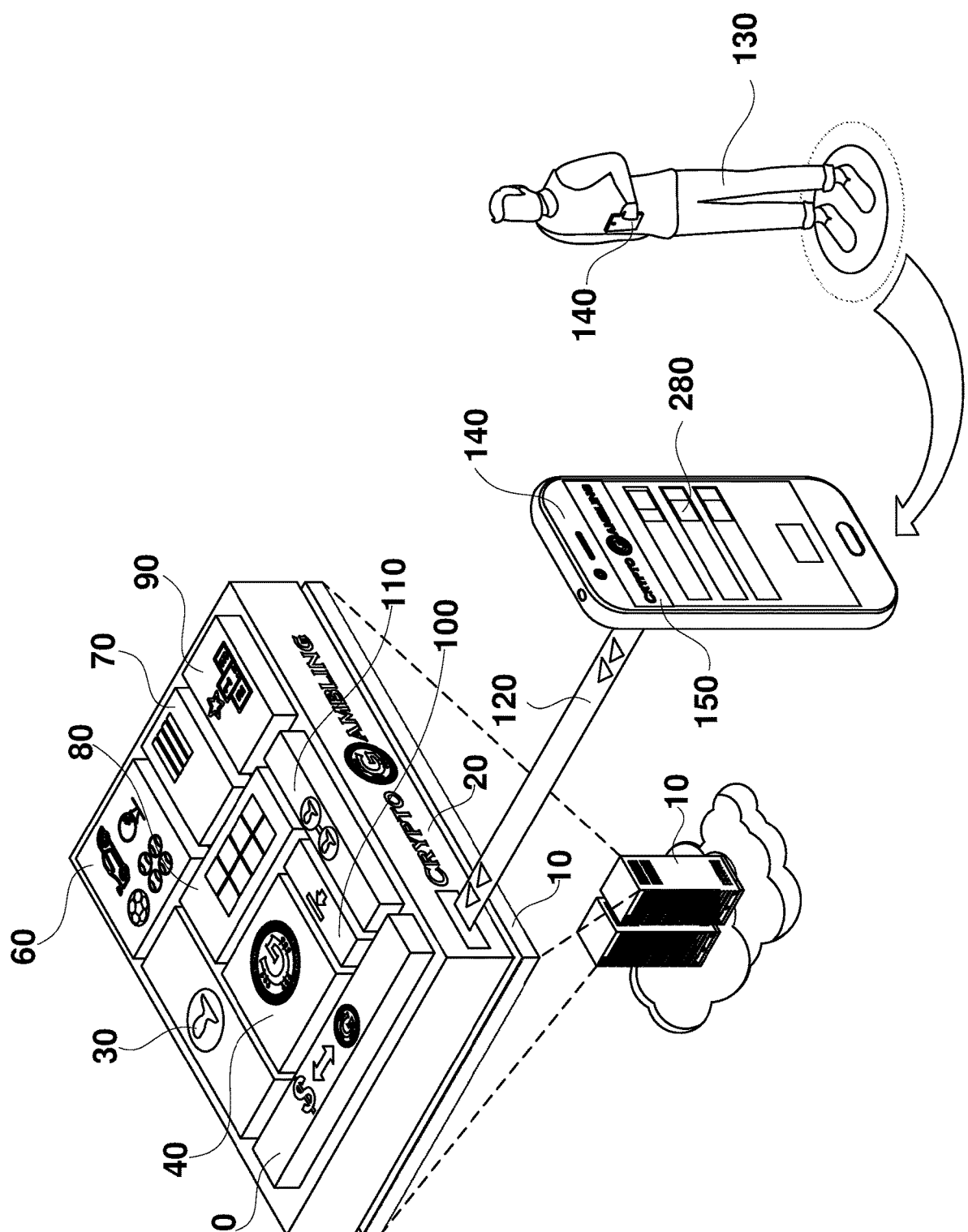
FIG. 7 details a user placing limits on their gambling by limiting the number and/or value of bets placed.

A user is able to place limits on their gambling activities as shown with the functionality detailed in segment 700 (further detailed in FIG. 7). To assist users to control their gambling, users can set a series of limits or time periods for their gambling activities. This may restrict them to only a certain number of bets or only a certain value of bets that can be placed in a pre-determined time period. Alternatively, limits may be placed on times of the day or week that bets can be placed. The user (130) uses the betting limits screen (280) of the application (150) to set the various limits.

Figure 8:
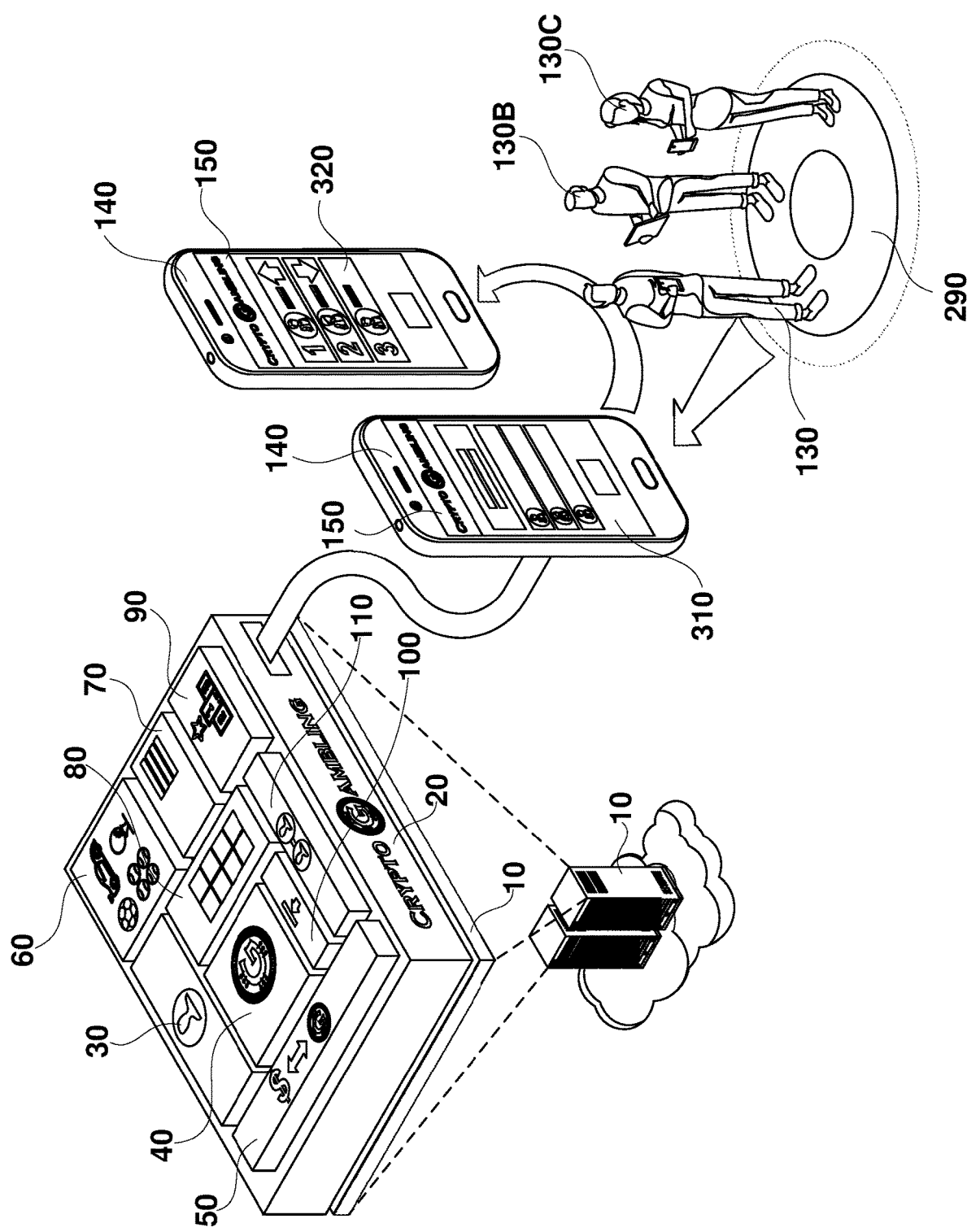
FIG. 8 details a user creating virtual rooms and competitions with other users.

FIG. 8 shows in greater detail the components of segment 800 which allows a user to create virtual rooms and competitions with other users. These virtual rooms, or competitions, may be limited to a certain market or sport, or alternatively have no restrictions. The virtual rooms, or competitions, may operate using a pooling arrangement where the winner takes all, or an arrangement where each user takes their own winnings where no money is won or lost. Users (130, 130B and 130C) access the virtual room functionality through the created virtual room screen (310) of the application (150). A leader board screen (320) allows members of the virtual rooms or competitions to see the performance of other users by reference to a leader board. Users can also message and interact with other users in their group to make using the system more sociable.

As described above, the system provides a computer implemented system and method of on-line gambling using a pseudo currency that allows both novice and problem users experience betting with large nominal values without risking large values, or possibly any amount, of real currency. The system provides the usual stimulus associated with engaging in gambling upon real world events with real time responses to read world events without the usual problems associated with the financial losses that can occur when engaging with standard on-line gambling services. The system and method of the present invention may further avoid the technical data communications network problems when operating with a potentially large number of users seeking to engage in "simulated" gambling to gain the knowledge and/or experience sought before engaging in "non-simulated" gambling.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word "comprise", and variations such as "comprises" and "comprising", will be understood to imply the inclusion of a stated feature or step, or group of features or steps, but not the exclusion of any other feature or step or group of features or steps.

The claims defining the invention are as follows:

1. A method of engaging with an on-line gambling service in which a user accesses an on-line gambling system that monitors real world events and calculates odds in respect of the events and aspects upon which wagers can be placed, the method including:

publishing, by the on-line gambling system, the events and the aspects upon which wagers are placed including odds offered to users wherein:

the user obtains gambling credits from the on-line gambling system;

the user places a timely wager including a wager amount by allocating gambling credits to the wager; and the user receiving, upon completion of the real world event upon which a wager has been placed, an indication regarding the result of the real world event and the winnings, or losses, attributable to the user with winnings provided to the user by the allocation of gambling credits to the user's on-line gambling credit account or, in the event the user incurs a loss as a result of the wager, the appropriate number of gambling credits being deducted from the user's on-line gambling credit account, wherein, the number of gambling credits wagered by the user in a pre-defined period is limited to a defined threshold, and monitoring, by the online-gambling system, whether the user is effecting wagers using gambling credits according to a pseudo currency that has a minimal or zero real world value, and in the event the user is effecting wagers with a pseudo currency having a zero real world value, actively reducing, by the on-line gambling system, the frequency of updates regarding the real world events and/or any other data thereby:

causing a reduced data transfer across a data communications network accessed by the user for placing wagers; and limiting the amount of results received by the user regarding the real world events.

2. A method according to claim 1, wherein the gambling credits are provided in the form of a crypto-currency offered solely by the on-line gambling system.

3. A method according to claim 1, wherein the credit accounts are established for the user upon registration with the on-line gambling system.

4. A method according to claim 1, wherein the user establishes a credit account and purchases crypto-currency credits with real funds.

5. A method according to claim 1, wherein the gambling system provides (i) details regarding real world events upon which wagers may be placed in real time and (ii) indications regarding results of the real world events also in real time.

6. A method according to claim 1, wherein the on-line gambling system enables the creation of a virtual room in which users may collectively compete with each other.

7. A method according to claim 6, wherein the users are ranked according to their performance within a predefined period when competing in the virtual room.

8. A method according to claim 7, wherein the performance ranking is based upon the user's wagering profit.

9. A method according to claim 1, wherein the on-line gambling system provides an ability for the user to place simultaneous wagers on a number of sporting events.

10. An on-line gambling system operable to receive wagers from gamblers in respect of real world events, the on-line gambling system capable of receiving wagers solely with gambling credits recognised by the gambling system, the on-line gambling system including:

a data feed providing data in respect of real world events upon which gamblers may place wagers;

an odds calculator operable to calculate odds in respect of aspects of real world events;

a wager interface operable to present gamblers with details of real world events upon which gamblers may place wagers and to receive wagers from gamblers including a wager amount in gambling credits;

a wager recordal database operable to store details of wagers including the event, the odds and wager amount placed by the gambler; and a wager result determination calculator operable to receive details of events and aspects of events upon which wagers were available for gamblers and upon completion of an event, calculating the winnings, or losses, attributable to gamblers who placed wagers on the event and either allocating winnings to a credit account associated with the gambler or deducting losses from the credit account associated with the gambler, wherein the number of gambling credits wagered in a pre-defined period is limited to a defined threshold, and wherein the online-gambling system is further operable to:

monitor whether the user is effecting wagers using gambling credits according to a pseudo currency that has a minimal or zero real world value, and in the event the user is effecting wagers with a pseudo currency having a zero real world value, actively reduce the frequency of updates regarding the real world events and/or any other data thereby:

causing a reduced data transfer across a data communications network accessed by the user for placing wagers; and limiting the amount of results received by the user regarding the real world events.

11. A system according to claim 10, wherein the gambling credits are provided in the form of a crypto-currency offered solely by the on-line gambling system.

12. A system according to claim 10, wherein the system establishes a credit account for the gambler upon on-line registration.

13. A system according to claim 10, wherein the gambler establishes a credit account and purchases crypto-currency credits with real funds.

14. A system according to claim 10, wherein the gambling system provides (i) details regarding real world events upon which wagers may be placed in real time and (ii) indications regarding results of the real world events also in real time.

15. A system according to claim 10, further configured to enable the creation of a virtual room in which gamblers collectively compete with each other.

16. A system according to claim 15, wherein the gamblers are ranked according to their performance within a predefined period when competing in the virtual room.

17. A system according to claim 16, wherein the performance ranking is based upon gambling profit.

18. A system according to claim 10, further configured to enable gamblers to place simultaneous wagers on a number of sporting events.

19. A non-transitory computer-readable medium that, when executed on a computer, causes one or more computer processor devices to perform the steps of:

monitoring, with the one or more processors, real world events;

calculating, with the one or more processors, odds in respect of the events and aspects upon which wagers will be accepted;

publishing, by the one or more processors, the events and the aspects upon which wagers are placed including odds offered to users wherein:

providing, to a user, gambling credits from the on-line gambling system;

receiving, from the user, a timely wager including a wager amount by allocating gambling credits to the wager; and providing, to the user, upon completion of the real world event upon which a wager has been placed, an indication regarding the result of the real world event and the winnings, or losses, attributable to the user with winnings provided to the user by the allocation of gambling credits to the user's on-line gambling credit account or, in the event the user incurs a loss as a result of the wager, the appropriate number of gambling credits deducted from the user's on-line gambling credit account, wherein the number of gambling credits wagered in a pre-defined period is limited to a defined threshold; and wherein the one or more processors are caused to further perform the steps of:

monitoring whether the user is effecting wagers using gambling credits according to a pseudo currency that has a minimal or zero real world value, and in the event the user is effecting wagers with a pseudo currency having a zero real world value, actively reducing the frequency of updates regarding the real world events and/or any other data thereby:

causing a reduced data transfer across a data communications network accessed by the user for placing wagers; and limiting the amount of results received by the user regarding the real world events.

\* \* \* \* \*